(12) United States Patent
Souers

(10) Patent No.: US 12,297,895 B1
(45) Date of Patent: May 13, 2025

(54) RESOLVER ASSEMBLY FOR HYBRID MODULE

(71) Applicant: Schaeffler Technologies AG & Co. KG, Herzogenaurach (DE)

(72) Inventor: Long Souers, North Canton, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/585,257

(22) Filed: Feb. 23, 2024

(51) Int. Cl.
| | |
|---|---|
| *F16H 45/02* | (2006.01) |
| *B60K 6/387* | (2007.10) |
| *B60K 6/48* | (2007.10) |

(52) U.S. Cl.
CPC .............. *F16H 45/02* (2013.01); *B60K 6/387* (2013.01); *B60K 2006/4825* (2013.01)

(58) Field of Classification Search
CPC .......................... B60K 6/20–485; F16H 41/28
See application file for complete search history.

(56) References Cited

U.S. PATENT DOCUMENTS

| | | | | |
|---|---|---|---|---|
| 5,226,807 | A * | 7/1993 | By ........................ | F16H 41/28 403/268 |
| 10,330,185 | B2 | 6/2019 | Gurney | |
| 10,995,802 | B2 | 5/2021 | Lehmann et al. | |
| 11,433,755 | B2 * | 9/2022 | Kitada ...................... | H02K 7/10 |
| 11,575,294 | B2 * | 2/2023 | Satyaseelan ............. | B60K 6/40 |
| 11,581,787 | B2 * | 2/2023 | Angel ...................... | B60K 6/26 |
| 11,746,868 | B2 * | 9/2023 | Ramsey ................... | F16H 45/02 192/3.29 |
| 2014/0314552 | A1 | 10/2014 | Jameson | |
| 2023/0069272 | A1 | 3/2023 | Norwich et al. | |

* cited by examiner

*Primary Examiner* — James J Taylor, II

(57) ABSTRACT

A hybrid module includes a rotor carrier including an axially extending portion. The hybrid module further includes a torque converter assembly having an impeller. The impeller includes an impeller shell non-rotatably connected to the axially extending portion. The impeller shell includes a row of slots extending axially through the impeller shell. The hybrid module further includes a resolver assembly having a resolver carrier. The resolver carrier includes a plurality of tabs circumferentially spaced from each other. Each of the tabs being arranged to engage one respective slot of the impeller shell.

19 Claims, 4 Drawing Sheets

RESOLVER ASSEMBLY FOR HYBRID MODULE

TECHNICAL FIELD

The present disclosure relates generally to a hybrid module and, more specifically, to a resolver assembly for a hybrid module.

BACKGROUND

Hybrid modules are generally known. Often, it is a challenge to package and/or fit all the desired components, e.g., an e-motor, crank damper, torque converter, torque converter clutch, K0 clutch, and resolver within the hybrid module architecture due to axial constraints. Due to limited spacing within a hybrid module envelope, it is desirable to have alternative designs and configurations to fit all the necessary components within the hybrid module while still meeting durability and performance requirements.

SUMMARY

Embodiments of the present disclosure provides a hybrid module including a rotor carrier having an axially extending portion. The hybrid module further includes a torque converter assembly having an impeller. The impeller includes an impeller shell non-rotatably connected to the axially extending portion. The impeller shell includes a row of slots extending axially through the impeller shell. The hybrid module further includes a resolver assembly having a resolver carrier. The resolver carrier includes a plurality of tabs circumferentially spaced from each other. Each of the tabs being arranged to engage one respective slot of the impeller shell.

In embodiments, wherein the torque converter assembly may be arranged radially inside of the axially extending portion. In embodiments, each tab may extend through the corresponding slot. In embodiments, each tab may be connected to the impeller shell via brazing.

In embodiments, the resolver assembly may further include a resolver rotor supported by the resolver carrier. The resolver rotor may be disposed radially inside of the rotor carrier. The resolver assembly may further includes a resolver stator axially aligned with the resolver rotor. The resolver stator may be fixed relative to the resolver rotor radially outside of the rotor carrier.

In embodiments, the impeller may further include an impeller hub fixed to the impeller shell. The resolver carrier may be radially spaced from the impeller hub. In embodiments, the impeller may further include a plurality of blades circumferentially spaced from each other and fixed to the impeller shell. Each slot may be arranged circumferentially between two respective blades.

Embodiments of the present disclosure further provides a torque converter having an impeller. The impeller includes an impeller shell having a row of slots extending axially through the impeller shell. The torque converter further includes a resolver assembly having a resolver carrier. The resolver carrier includes a plurality of tabs circumferentially spaced from each other. Each of the tabs being arranged to engage one respective slot of the impeller shell.

In embodiments, each tab may extend through the corresponding slot. In embodiments, each tab may be connected to the impeller shell via brazing. In embodiments, the resolver assembly may further include a resolver rotor supported by the resolver carrier.

In embodiments, the impeller may further include an impeller hub fixed to the impeller shell. The resolver carrier may be radially spaced from the impeller hub. In embodiments, the impeller may further include a plurality of blades circumferentially spaced from each other and fixed to the impeller shell. Each slot may be arranged circumferentially between two respective blades.

Embodiments of the present disclosure further provides a method for assembling a resolver assembly of a hybrid module. The method includes providing an impeller. The impeller includes an impeller shell having a plurality of slots circumferentially spaced from each other. The method further includes providing a resolver carrier. The resolver carrier includes a plurality of tabs circumferentially spaced from each other. The method further includes inserting each tab of the resolver carrier into one respective slot of the impeller shell. The method further includes fixing each tab to the impeller shell.

In embodiments, the tabs may be fixed to the impeller shell via brazing.

In embodiments, the method may further include providing a resolver rotor. The method may further include locating the resolver rotor on the resolver carrier such that the resolver rotor contacts an annular wall of the resolver carrier. The method may further include fixing the resolver rotor to the resolver carrier. The impeller may include an impeller hub fixed to the impeller shell. The resolver carrier may be radially spaced from the impeller hub. The impeller may further include a plurality of blades circumferentially spaced from each other and fixed to the impeller shell. Each slot may be arranged circumferentially between two respective blades.

Embodiments of the present disclosure provide the advantageous benefit of providing a resolver carrier that is engaged with an impeller shell via a tabbed connection. Further, embodiments disclosed herein offer design advantages by fixing the resolver carrier to the impeller shell via brazing, which allows for fixing the resolver carrier to the impeller shell without welding processes, which can be costly and can deform the impeller shell.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Typically, hybrid vehicles that combine a battery powered e-motor and an automatic transmission driven by a combustion engine will be limited by available space. E-motors require a resolver in order to register the location of the rotating rotor. Therefore, a stationary piece on the outside diameter of the resolver (resolver stator), and a rotating piece (resolver rotor) on the inside diameter are required for proper e-motor function. The resolver takes available space away from inside the transmission of a hybrid vehicle. If the resolver could be combined with another rotating shaft/part inside the transmission, or specifically on the automatic transmission's torque converter, more space can be made available within the hybrid vehicle. Embodiments according to the present disclosure provide a hybrid module with a resolver combined with a torque converter.

Figure 1:
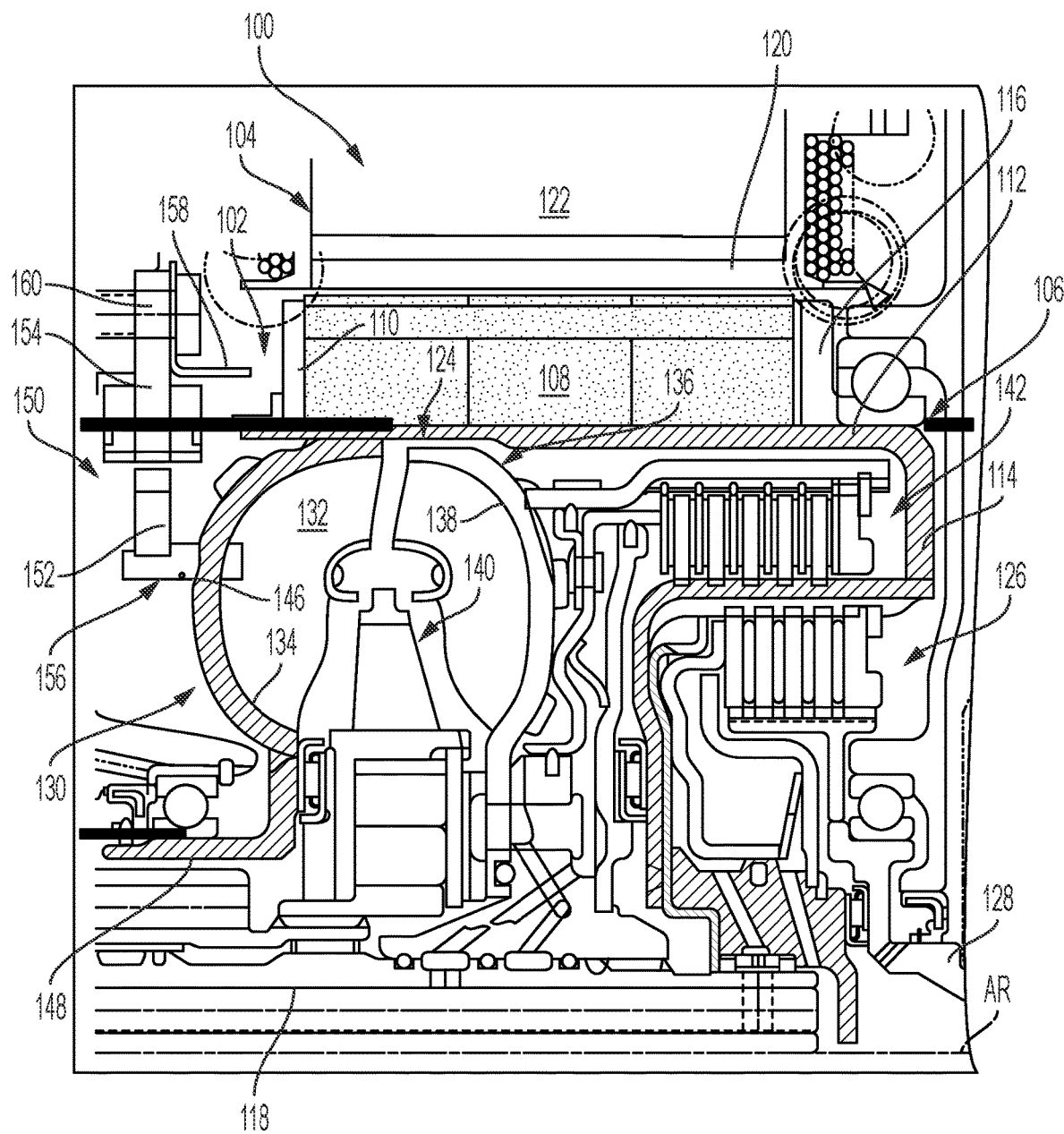
FIG. 1 shows a partial cross-sectional view of a hybrid module according to an exemplary embodiment of the present disclosure.
Figure 2:
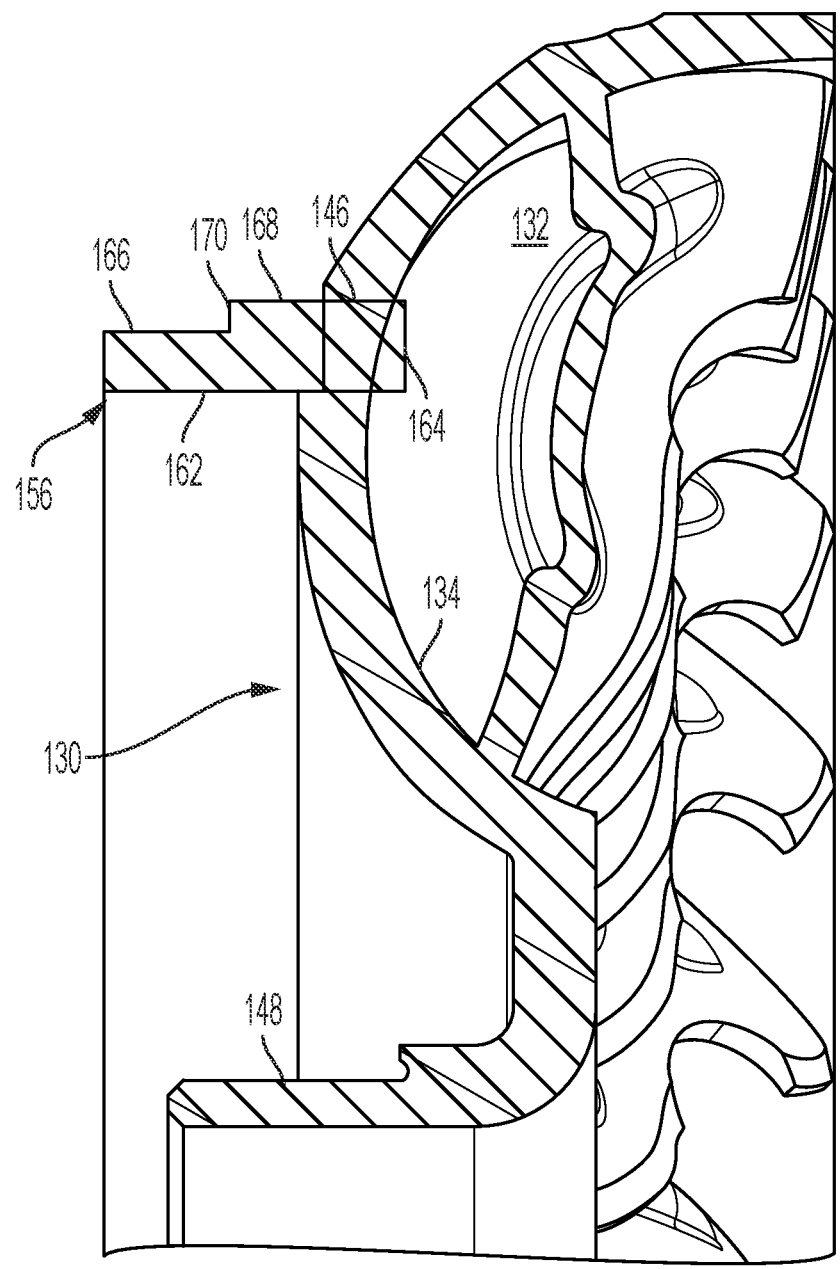
FIG. 2 illustrates an enlarged view of an area of the hybrid module shown in FIG. 1.
Figure 3:
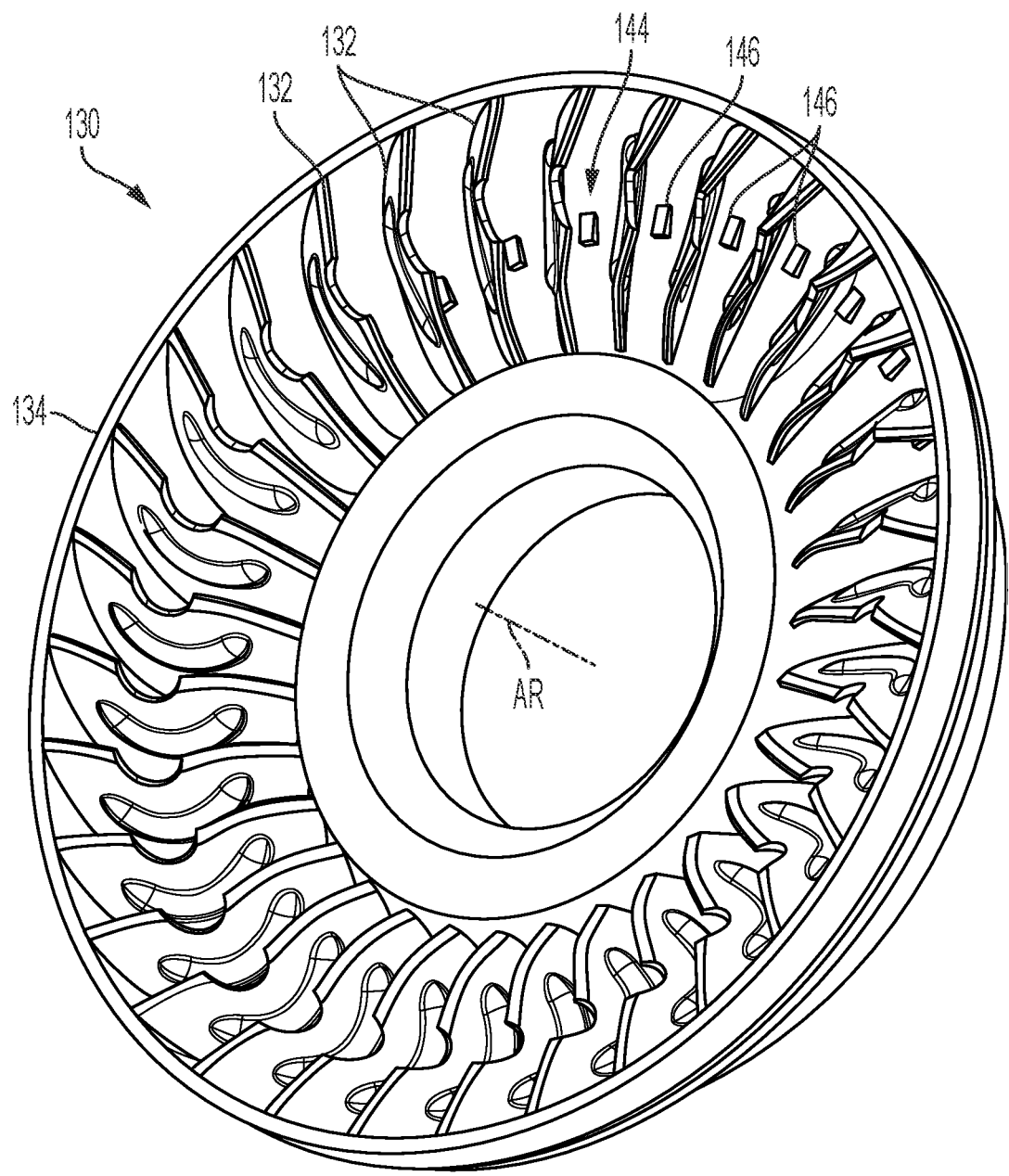
FIG. 3 illustrates a perspective view of an impeller according to an exemplary embodiment of the present disclosure.
Figure 4:
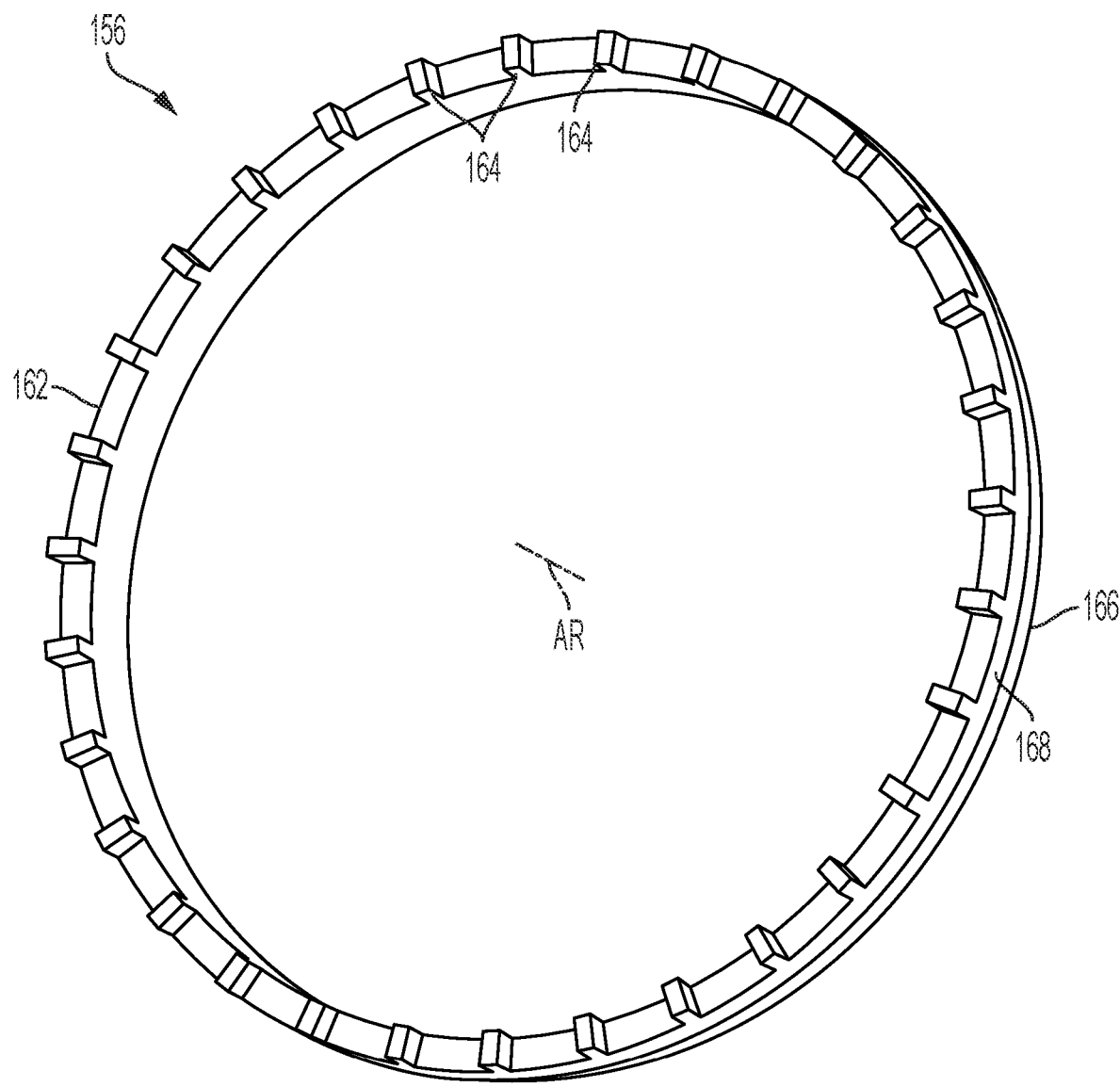
FIG. 4 illustrates a perspective view of a resolver carrier according to an exemplary embodiment of the present disclosure.

Referring to FIGS. 1-4, a portion of a hybrid module 100 is illustrated according to an exemplary embodiment of the present disclosure. At least some portions of the hybrid module 100 are rotatable about an axis of rotation AR. While only a portion of the hybrid module 100 above the axis of rotation AR is shown in FIG. 1, it should be understood that the hybrid module 100 can appear substantially similar below the axis of rotation AR with many components extending about the axis of rotation AR. Words such as "axial," "radial," "circumferential," "outward," etc. as used herein are intended to be with respect to the axis of rotation AR.

The hybrid module 100 includes a rotor assembly 102 and a stator assembly 104 forming an e-motor assembly. The rotor assembly 102 includes a rotor carrier 106, a rotor segment 108, and an end ring 110. The rotor carrier 106 includes an axially extending portion 112, a radially extending portion 114, and a rotor flange 116. The rotor flange 116 is fixed to the axially extending portion 112 of the rotor carrier 106 and extends radially outward away from the axis of rotation AR. The radially extending portion 1114 extends radially inward towards the axis of rotation AR from an end of the axially extending portion 112. The radially extending portion 114 is radially spaced from a transmission input shaft 118. The rotor flange 116 is disposed axially between the rotor segment 108 and the radially extending portion 114.

The rotor segment 108 is installed and arranged on an outer surface of the axially extending portion 112 of the rotor carrier 106. In one embodiment, the rotor segment 108 may be comprised of a stack of segments. The end ring 110 is fixed to the outer surface of the axially extending portion 112 of the rotor carrier 106. The rotor assembly 102 may include a spring end plate (not shown) arranged on an axial side of the rotor segment 108. In this way, the spring end plate may be disposed axially between the end ring 110 and the rotor segment 108. Additionally, or alternatively, the rotor assembly 102 may include a further spring end plate (not shown) arranged on an opposite axial side of the rotor segment 108. In this way, the further spring end plate may be disposed axially between the rotor segment 108 and the rotor flange 116. The end ring 110 is configured to clamp and/or secure the rotor segment 108 to the rotor carrier 106, e.g., via compressing the spring end plate(s), for frictional torque transmission therebetween. Once the desired compression force is achieved, the end ring 110 is fixed to the rotor carrier 106, e.g., by welding.

The stator assembly 104 is disposed radially outside of the rotor assembly 102 and is fixed relative to the rotor assembly 102. The stator assembly 104 includes a stator carrier 120 and a stator segment 122. In one embodiment, the stator segment 122 may be a stack of stator segments. The stator segment 122 is installed and arranged on an inner surface of the stator carrier 120. In one embodiment, the stator segment 122 may be installed on the stator carrier 120 via a shrink fit arrangement. That is, the stator carrier 120 is heated to expand the inner surface, the stator segment 122 is installed on the stator carrier 120, and the inner surface shrink fits to the stator segment 122 after the stator carrier 120 cools.

The hybrid module 100 may include a K0 clutch 126 fully disposed radially inside the rotor assembly 102. The K0 clutch 126 is arranged to drivingly connect the rotor assembly 102 to a K0 shaft 128. In other words, the K0 clutch 126 selectively connects and disconnects the rotor assembly 102 and the K0 shaft 128. The K0 shaft 128 is arranged for driving connection with a crankshaft (not numbered) of an internal combustion engine (not shown). In other words, the K0 shaft 128 is arranged to receive torque from the engine and/or transmit torque to the engine when installed and operated in a vehicle powered at least in part by the engine.

The hybrid module 100 further includes a torque converter assembly 124 fully disposed radially inside of the rotor assembly 102. The torque converter assembly 124 includes: an impeller 130 having an impeller shell 134 with a plurality of impeller blades 132 attached thereto, a turbine 136 having a turbine shell 138 with at least one blade (not numbered) attached thereto; a stator 140 having at least one blade (not numbered) attached thereto; and a lock-up clutch 142. The impeller shell 134 may be fixed to the rotor carrier 106, e.g., via a welded connection. The impeller shell 134 and the rotor carrier 106 together form a housing for the torque converter assembly 124. The lock-up clutch 142 and the stator 140 are disposed within the housing formed by the impeller shell 134 and the rotor carrier 106.

The impeller shell 134 includes a row 144 of slots 146. The slots 146 extend entirely through the impeller shell 134 along the axis of rotation AR, i.e., through an axially inner surface and an axially exterior surface of the impeller shell 134. The slots 146 are spaced from each other circumferentially about the axis of rotation AR. The slots 146 may be arranged circumferentially between the impeller blades 132. That is, each slot 146 may be arranged between two circumferentially adjacent impeller blades 132.

The impeller shell 134 may include one or more rows (not shown) of outer grooves (not shown) arranged radially outside of the row 144 of slots 146. Each outer groove may be arranged to engage one respective impeller blade 132.

The outer grooves may extend partially or entirely through the impeller shell 134 along the axis of rotation AR. Additionally, or alternatively, the impeller shell 134 may include one or more rows (not shown) of inner grooves (not shown) arranged radially inside of the row 144 of slots 146. Each inner groove may be arranged to engage one respective impeller blade 132. The inner grooves may extend partially or entirely through the impeller shell 134 along the axis of rotation AR.

The impeller 130 further includes an impeller hub 148 connected to an inner end of the impeller shell 134, for example, via welding. The impeller hub 148 extends in an axial direction away from the impeller shell 134.

The hybrid module 100 further includes a resolver assembly 150 including a resolver rotor 152; a resolver stator 154; and a resolver carrier 156. The resolver stator 154 is fixed to a housing (not numbered) of the hybrid module 100 via a plate 158 and a connector 160. The connector 160 fixes the plate 158 to the housing, and the resolver stator 154 is clamped therebetween. The connector 160 is disposed radially outside of the resolver stator 154. The connector 160 may be fixed to the housing radially outside of the rotor carrier 106.

The resolver rotor 152 is axially aligned with the resolver stator 154. That is, a line can be drawn normal to axis of rotation AR that extends through both the resolver stator 154 and the resolver rotor 152. The resolver rotor 152 is supported by the resolver carrier 156. The resolver rotor 152 extends radially outwardly from the resolver carrier 156. The resolver rotor 152 may be disposed radially inside of the rotor carrier 106.

The resolver carrier 156 is engaged with the impeller shell 134. The resolver carrier 156 includes a body 162 extending annularly about the axis of rotation AR and a plurality of tabs 164 extending axially from the body 162. The body 162 may contact the impeller shell 134, e.g., the axially exterior surface thereof. The tabs 164 extend in an axial direction away from the resolver rotor 152. The tabs 164 are circumferentially spaced from each other about the axis of rotation AR. Each tab 164 is arranged to engage one respective slot 146 in the impeller shell 134. Each tab 164 extends through one respective slot 146. That is, each tab 164 extends into the respective slot 146 at least to the axially inner surface of the impeller shell 134.

The body 162 of the resolver carrier 156 includes an outer surface having a first portion 166 and a second portion 168 arranged radially outside of the first portion 166. The body 162 further includes an annular wall 170 extending from the first portion 166 to the second portion 168. The resolver rotor 152 is arranged on the first portion 166 of the body 162 and contacts the annular wall 170. The resolver rotor 152 is axially retained against the annular wall 170 via a connection, e.g., a welded connection, a staked connection, etc.

A method for assembly of the resolver assembly 150 includes providing the resolver carrier 156 and the impeller shell 134. The method also includes inserting the plurality of tabs 164 into corresponding slots 146 in the impeller shell 134. The method also includes fixing the resolver carrier 156 to the impeller shell 134 via brazing. For example, the tabs 164 may be brazed to the axially inner surface of the impeller shell 134. The tabs 164 may be brazed to the impeller shell 134 in a same or different brazing operation as the impeller blades 132. The method may also include positioning the resolver rotor 152 against the annular wall 170 on the body 162 of the resolver carrier 156. The method may also include axially retaining the resolver rotor 152 on the body 162, e.g., via welding, staking, etc. The method may also include axially aligning the resolver stator 154 with the resolver rotor 152 and fixing the resolver stator 154 to the housing of the hybrid module 100, as discussed above. The steps provided above are a non-limiting example and are not required to be performed in the order provided.

Providing a tabbed connection between the resolver carrier 156 and the impeller shell 134 and brazing the tabs 164 allows for combining the resolver assembly 150 with the torque converter assembly 124 without welded connections, which reduces a likelihood of distortion of the impeller shell 134 during assembly of the resolver carrier 156 while reducing the envelope of the hybrid module 100.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS 100 hybrid module
102 rotor assembly
104 stator assembly
106 rotor carrier
rotor segment
110 end ring
112 axially extending portion
114 radially extending portion
116 rotor flange
118 transmission input shaft
120 stator carrier
122 stator segment
124 torque converter assembly
126 K0 clutch
128 K0 shaft
130 impeller
132 impeller blade
134 impeller shell
136 turbine
138 turbine shell
140 stator
142 lock-up clutch
144 row
146 slot
148 impeller hub
150 resolver assembly
152 resolver rotor 154 resolver stator
156 resolver carrier
158 plate
160 connector
162 body
164 tabs
166 portion
168 portion
170 annular wall
AR axis of rotation

What is claimed is:

1. A hybrid module, comprising:
 a rotor carrier including an axially extending portion;
 a torque converter assembly including an impeller having an impeller shell non-rotatably connected to the axially extending portion, the impeller shell including a row of slots extending axially through the impeller shell; and
 a resolver assembly including a resolver carrier having a plurality of tabs circumferentially spaced from each other, each of the tabs being arranged to engage one respective slot of the impeller shell.

2. The hybrid module according to claim 1, wherein the torque converter assembly is arranged radially inside of the axially extending portion.

3. The hybrid module according to claim 1, wherein each tab extends through their respective slot.

4. The hybrid module according to claim 1, wherein each tab is connected to the impeller shell via brazing.

5. The hybrid module according to claim 1, wherein the resolver assembly further includes a resolver rotor supported by the resolver carrier.

6. The hybrid module according to claim 5, wherein the resolver rotor is disposed radially inside of the rotor carrier.

7. The hybrid module according to claim 5, wherein the resolver assembly further includes a resolver stator axially aligned with the resolver rotor, the resolver stator being fixed relative to the resolver rotor radially outside of the rotor carrier.

8. The hybrid module according to claim 1, wherein the impeller further includes an impeller hub fixed to the impeller shell, the resolver carrier being radially spaced from the impeller hub.

9. The hybrid module according to claim 1, wherein the impeller further includes a plurality of blades circumferentially spaced from each other and fixed to the impeller shell, each slot being arranged circumferentially between two respective blades.

10. A torque converter, comprising:
 an impeller including an impeller shell having a row of slots extending axially through the impeller shell; and
 a resolver assembly including a resolver carrier having a plurality of tabs circumferentially spaced from each other, each of the tabs being arranged to engage one respective slot of the impeller shell.

11. The torque converter according to claim 10, wherein each tab extends through their respective slot.

12. The torque converter according to claim 10, wherein each tab is connected to the impeller shell via brazing.

13. The torque converter according to claim 10, wherein the resolver assembly further includes a resolver rotor supported by the resolver carrier.

14. The torque converter according to claim 10, further comprising an impeller hub fixed to the impeller shell, the resolver carrier being radially spaced from the impeller hub.

15. The torque converter according to claim 10, wherein the impeller further includes a plurality of blades circumferentially spaced from each other and fixed to the impeller shell, each slot being arranged circumferentially between two respective blades.

16. A method for assembly of a resolver assembly for a hybrid module, comprising:
 providing an impeller, wherein the impeller includes an impeller shell having a plurality of slots circumferentially spaced from each other;
 providing a resolver carrier, wherein the resolver carrier includes a plurality of tabs circumferentially spaced from each other;
 inserting each tab of the resolver carrier into one respective slot of the impeller shell; and
 fixing each tab to the impeller shell via brazing.

17. The method according to claim 16, further comprising:
 providing a resolver rotor;
 locating the resolver rotor on the resolver carrier such that the resolver rotor contacts an annular wall of the resolver carrier; and
 fixing the resolver rotor to the resolver carrier.

18. The method according to claim 17, wherein the impeller includes an impeller hub fixed to the impeller shell, the resolver carrier being radially spaced from the impeller hub.

19. The method according to claim 16, wherein the impeller further includes a plurality of blades circumferentially spaced from each other and fixed to the impeller shell, each slot being arranged circumferentially between two respective blades.

* * * * *